UNITED STATES PATENT OFFICE.

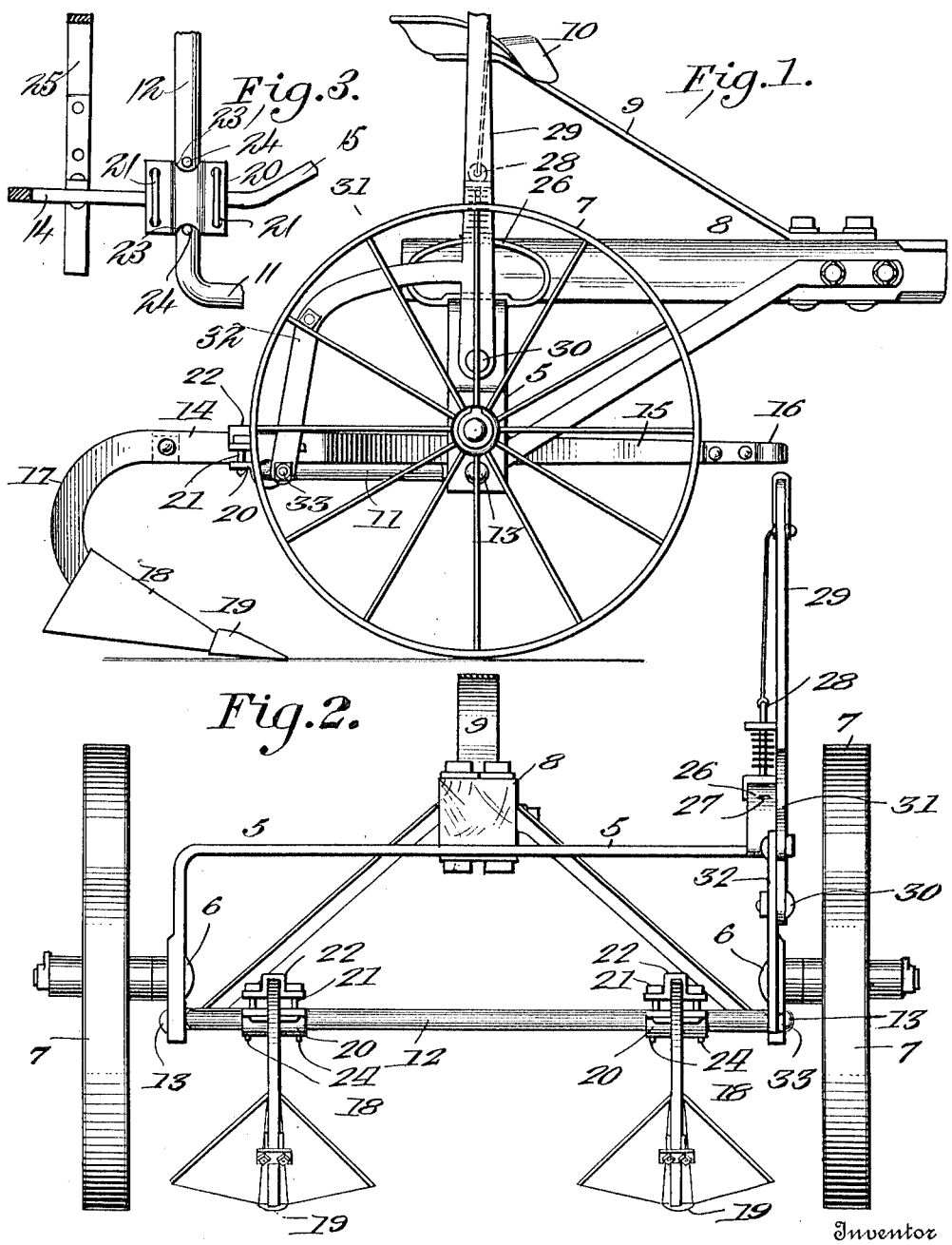

IRA BRINKERHOFF, OF HUNTINGTON, UTAH.

FARMING IMPLEMENT.

1,063,849.　　　　Specification of Letters Patent.　　Patented June 3, 1913.

Application filed July 19, 1911. Serial No. 639,368.

*To all whom it may concern:*

Be it known that I, IRA BRINKERHOFF, a citizen of the United States, residing at Huntington, in the county of Emery and State of Utah, have invented new and useful Improvements in Farming Implements, of which the following is a specification.

The invention relates to farming implements, and more particularly to the class of double-beam wheeled cultivators.

The primary object of the invention is the provision of a cultivator in which the shovel carrying arms or beams may be raised and lowered relative to the ground by an operator when riding in the cultivator.

Another object of the invention is the provision of a cultivator in which the soil working devices may be readily and easily adjusted to form the required depth of furrows in the ground, during the advancement of the machine.

A further object of the invention is the provision of a cultivator in which the ground working devices are supported by beams which are mounted upon an adjustable frame that may be raised and lowered, thus enabling the ground working devices to be adjusted to form furrows of any depth.

A still further object of the invention is the provision of a cultivator of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation thereof. Fig. 2 is a rear elevation. Fig. 3 is a fragmentary bottom plan view of the adjusting frame.

Similar reference characters indicate corresponding parts throughout the several views of the drawings.

Referring to the drawings by numerals, the cultivator comprises an inverted U-shaped frame 5, in the limbs of which are fixed laterally extending journals 6, on which are revolubly mounted supporting wheels 7, the same being of the ordinary well-known construction. Fixed medially to the frame 5 is the rear end of a draft pole or tongue 8 which extends forwardly the desired distance from the said frame, and supported upon this tongue is a seat standard 9 having a riding seat 10 of the usual construction, the standard 9 being connected to the tongue. Connected with the limbs of the frame 5 are the forwardly directed arms 11 of a U-shaped yoke or lifting bar 12, the arms 11 being connected to the limbs of the frame 5 by means of pivots 13, at a point below the journals 6 connected with the frame of the cultivator. Coupled with and crossing the yoke or lifting bar 12 are spaced parallel shovel beams 14, the same having forwardly converging front ends 15, which are brought together and fastened within a clevis 16, the rear ends of the beams 14 being formed with a rearwardly and downwardly curved standard 17, on which are mounted in the usual manner cultivator shovels 18 and coöperative removable points 19, the latter being arranged forwardly of the shovels, as usual. The beams 14 are coupled with the yoke or lifting bar by means of clips, each comprising a base plate 20, in which are engaged vertical bolt members 21, the latter being also engaged in bridge plates 22 which straddle the beams 14 crossing the top edges thereof, while the base plate extends across the under face of the yoke or lifting bar 12, the bolt members 21 being arranged in pairs at opposite sides of the latter. Each base plate, in opposite longitudinal side edges, is formed with elongated notches 23, in which project pins 24 fixed in the under face of the yoke or lifting bar 12, at opposite sides of the plate, and serve to prevent lateral displacement of the clips when coupling the beams 14 to the yoke or lifting bar.

Arranged rearwardly of the yoke or lifting bar 12, and suitably connected to the beams 14 is a stay brace 25 which gives strength and rigidity to both of the beams, and prevents the movement of the same toward or away from each other.

Securely mounted upon the frame 5, adjacent to one limb thereof, is a sector-shaped loop 26, the same being provided with a plurality of spaced apertures 27 in its top, in any one of which is adapted to engage a spring held locking pawl or dog 28 mounted in the usual manner upon a throw lever 29, the lower end of which is connected to the limb of the frame 5, adjacent thereto, by means of a pivot 30. The throw lever 29 is formed with a rearwardly and downwardly extending lifting arm 31, to which is pivotally connected one end of a link 32, the latter being adjustably pivoted to the arm 11 of the yoke or lifting bar 12, adjacent thereto, by means of a detachable pin 33. Thus, it will be seen that upon swinging the throw lever 29 in one direction when the same is unlocked from the loop 26, the said beams 14 may be raised from the ground the desired distance, and on locking the said lever 29 to the loop 26, the beams will be sustained in adjusted position. It is evident that the beams 14 may be lowered, thereby enabling the forming of furrows in the ground of the required depth.

From the foregoing, taken in connection with the accompanying drawings, it is thought that the construction and operation of the invention will be readily understood, without requiring a more extended explanation.

What is claimed is:

A clamp for cultivators comprising plates adapted to embrace the drag beams and bail of the cultivator, said plates being provided with seats adapted to receive the drag beam and bail respectively, one of the said plates being provided with notches in opposite ends thereof adapted to receive lugs when engaged in the said bail, and bolt members passed through the plates for securing the same together.

In testimony whereof I affix my signature in presence of two witnesses.

IRA BRINKERHOFF.

Witnesses:
  WILLIAM A. GUYMON, Jr.,
  GEORGE F. WAKEFIELD.

---

Copies of this patent may be obtained for five cents each, by addressing the "Commissioner of Patents, Washington, D. C."